(12) United States Patent  
McCullough

(10) Patent No.: US 9,227,552 B2  
(45) Date of Patent: Jan. 5, 2016

(54) CARGO STRAP LAUNCHING DEVICE

(71) Applicant: David McCullough, Greeley, CO (US)

(72) Inventor: David McCullough, Greeley, CO (US)

( * ) Notice: Subject to any disclaimer, the term of this patent is extended or adjusted under 35 U.S.C. 154(b) by 0 days.

(21) Appl. No.: 14/263,047

(22) Filed: Apr. 28, 2014

(65) Prior Publication Data

US 2015/0307015 A1   Oct. 29, 2015

(51) Int. Cl.
*B60P 7/08* (2006.01)

(52) U.S. Cl.
CPC ............... *B60P 7/0853* (2013.01); *B60P 7/083* (2013.01)

(58) Field of Classification Search
CPC ............ B60P 7/0853; B65J 1/00; B25B 9/00; B65B 13/025; B25F 1/00; F41B 3/03
USPC .................... 410/97, 98, 99, 100, 156; 43/19; 294/15, 24, 210, 211; 81/489, 490; 16/426, 427, 429; 7/167, 168
See application file for complete search history.

(56) References Cited

U.S. PATENT DOCUMENTS 7,393,031 B2    7/2008  Goulet  
8,915,685 B2 *  12/2014  Flores et al. .................... 410/99

* cited by examiner

*Primary Examiner* — Stephen Gordon  
(74) *Attorney, Agent, or Firm* — Scott L. Terrell, P.C.; Scott L. Terrell

(57) ABSTRACT

A cargo strap launching device is provided. A catapult frame is mounted on a trailer stake pocket bed rail. A lever arm has an upper and a lower end. The lower end is connected to the catapult frame. A coiled strap bucket is connected to the lever arm upper end. The bucket has a generally rectangular ejection opening so that the bucket is capable of retaining and then releasing a coiled cargo strap by pushing upwardly on the lever arm.

13 Claims, 5 Drawing Sheets ered in the coil, and the coil is manually thrown over the cargo. The
CARGO STRAP LAUNCHING DEVICE

STATEMENT OF FEDERALLY SPONSORED RESEARCH

Not Applicable.

BACKGROUND OF THE INVENTION

1. Field of the Invention

The present invention relates to securing cargo. In particular, it relates to a cargo strap coil launching apparatus for catapulting coiled cargo straps over a stacked load carried on a Conestoga-type or stake bed trailer.

2. Description of the Related Art

Persons concerned with the loading or transport of stacked cargo either manually drape, or throw, cargo straps over a load to retain the cargo in place during transit. In the case of stacked or tall loads, the cargo strap is typically formed in a coil, and the coil is manually thrown over the cargo. The opposite ends of the un-coiled straps are then secured in place to side rails of the stake bed. A problem exists, however, in so far as the coiled portions are awkward to manipulate, heavy, and difficult to throw over widely stacked or tall loads.

One such solution to the foregoing problem is disclosed in U.S. Pat. No. 7,393,031, to Goulet. There, a strap launcher has a bucket like coil retainer at one end of a longitudinally-extending pole handle. The coiled portion of the strap is inserted into the coil retainer with the other end of the strap secured to the retainer. In operation, a person grasps the pole handle with both hands, and casts the coiled strap from the retainer, using an over handed motion, which is not unlike that of a person casting a fishing lure into the ocean.

While the foregoing strap launcher offers some utility it is inefficient in leverage because in requires one to lift and balance the pole handle, coil retainer, and coiled cargo strap while attempting to cast the entire assembly with the arms, back, shoulders and legs, on a predetermined trajectory, so that the coiled strap accurately clears the stacked load. Moreover, it would also be difficult to operate in slippery or windy conditions because it requires a firm foothold and a proper trajectory to deploy the coiled portion of the strap over wide or tall stacked loads. Thus, what is needed is an improved coiled strap launcher which is easy to use in a wide variety of weather conditions, provides sufficient leverage without requiring the user to exert an undue amount of physical stress on the person's arms, back, shoulders and legs, but which is simple in construction and adaptable to a wide variety of truck bed or trailer configurations. The present invention satisfies these needs.

BRIEF SUMMARY OF THE INVENTION

It is therefore an object of the present invention to provide an improved coiled strap launcher which is easy to use under a variety of weather conditions, provides sufficient leverage without requiring the user to exert an undue amount of physical stress on the person's arms, back, shoulders and legs, but which is also simple in construction and adaptable for use with a wide variety of truck bed or trailer configurations.

To overcome the problems associated with the prior art, and in accordance with the presently intended purpose of the invention, as embodied and broadly described herein, briefly, a cargo strap launching device is provided. A catapult frame is mounted on a trailer stake pocket bed rail. A lever arm has an upper and a lower end. The lower end is connected to the catapult frame. A coiled strap bucket is connected to the lever arm upper end. The bucket has a generally rectangular ejection opening so that the bucket is capable of retaining and then releasing a coiled cargo strap by pushing upwardly on the lever arm.

Additional advantages of the present invention will be set forth in part in the description that follows, and, in part, will be obvious from that description or can be learned from practice or testing of the present invention. The advantages of the preferred embodiments of the present invention can now be realized and obtained by the invention as more particularly pointed out in the appended claims.

BRIEF DESCRIPTION OF THE SEVERAL VIEWS OF THE DRAWINGS

The accompanying drawings, which are incorporated in and which constitute a part of the specification, illustrate at least one embodiment of the present invention and, taken together with the description, explain the principles of the invention.

DETAILED DESCRIPTION OF THE DRAWINGS

Unless specifically defined otherwise, all scientific and technical terms, used herein, have the same ordinary meaning as would be commonly understood by one of ordinary skill in the art to which this invention belongs.

Figure 1:
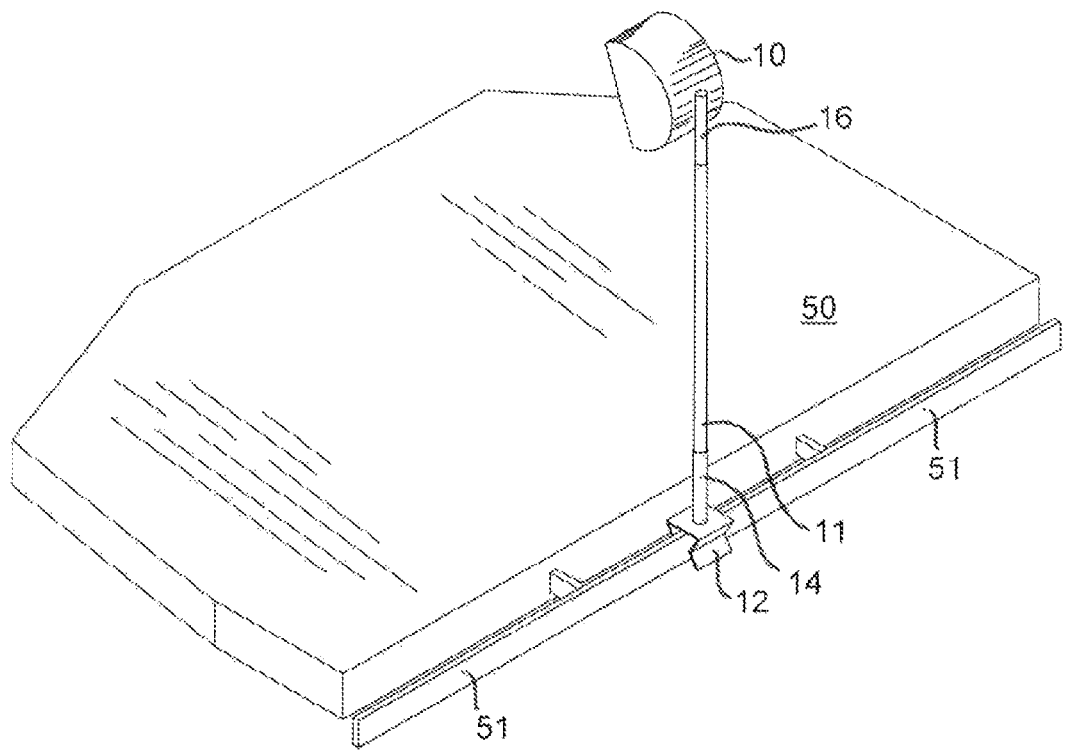
FIG. 1 is an isometric view of a generally embodiment of the present invention showing an embodiment when the base is pivotally attached to the stake bed rail.

Referring now to the drawing figures, wherein like numerals represent like features of the presently preferred embodiments of the present invention, a cargo strap launching device is provided. Broadly stated, in the presently preferred embodiment, the catapult frame 12 is mounted on a trailer bed 50 stake pocket bed rail 51. A lever arm 11 has an upper and a lower end. The lower end is connected to the catapult frame 12. A coiled strap bucket 10 is connected to the lever arm upper end. The bucket 10 has a generally rectangular ejection opening so that the bucket 10 is capable of retaining and then releasing a coiled cargo strap by pushing upwardly on the lever arm 11. The lever arm 11 may, but need not be a pole constructed of any resilient material well known in the art such as aluminum, fiberglass, steel, carbon fiber, or a polymeric composition. In this manner, it is desirably to form the base 12 with a longitudinal connector 14 and the bucket with a similar longitudinal connector 16 to assembly by splicing the pole with the bucket 10 and base 12, assembly. FIG. 1 also illustrates yet one example of a possibly configuration of the base 12, as a clip shaped so that the base 12 is capable of rotating, forward and aft, in relation to the stake bed rail.

Here, it is also intended for the base to be configured as a fork-like member, or a hook adapted to be carried on the stake bed rail 51.

Figure 2:
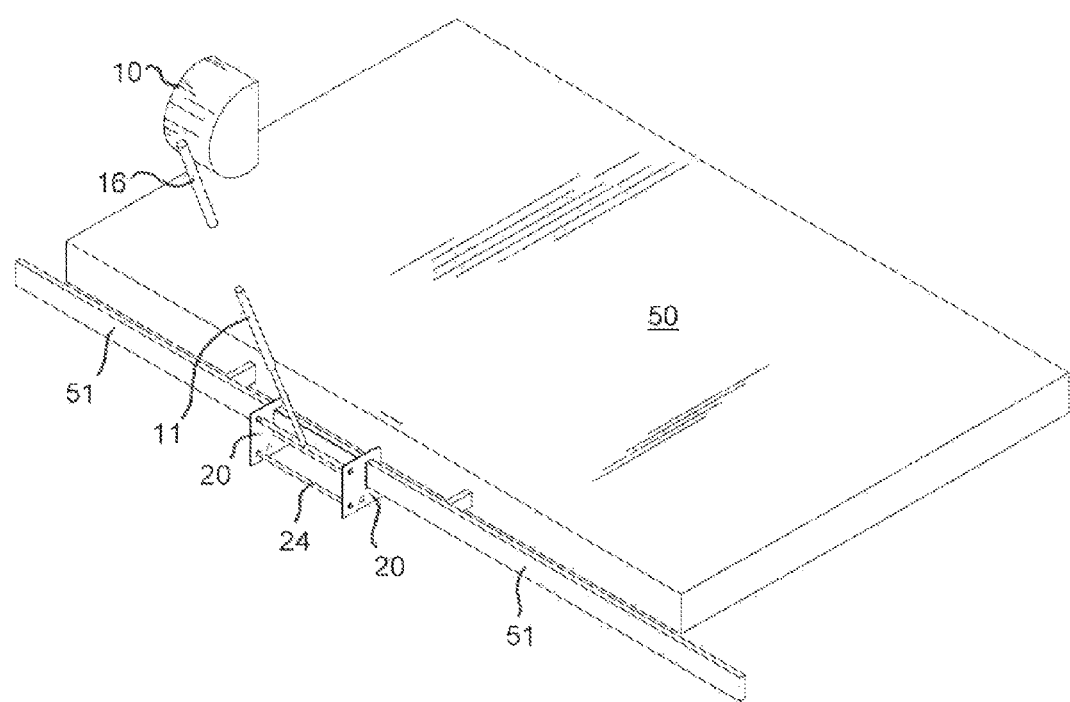
FIG. 2 is an isometric view showing a second preferred embodiment of the present invention where the base includes a bar a sleeve pivotal connection to the lever arm.
Figure 3:
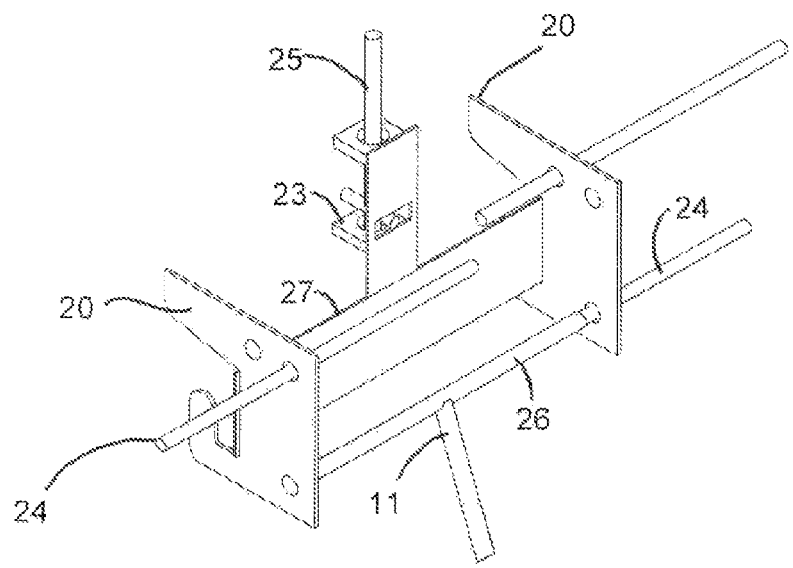
FIG. 3 is an isometric bottom view of the embodiment according to FIG. 2, but which also includes a bracket and stop pin assembly for biasing against the stake bed rail.
Figure 4:
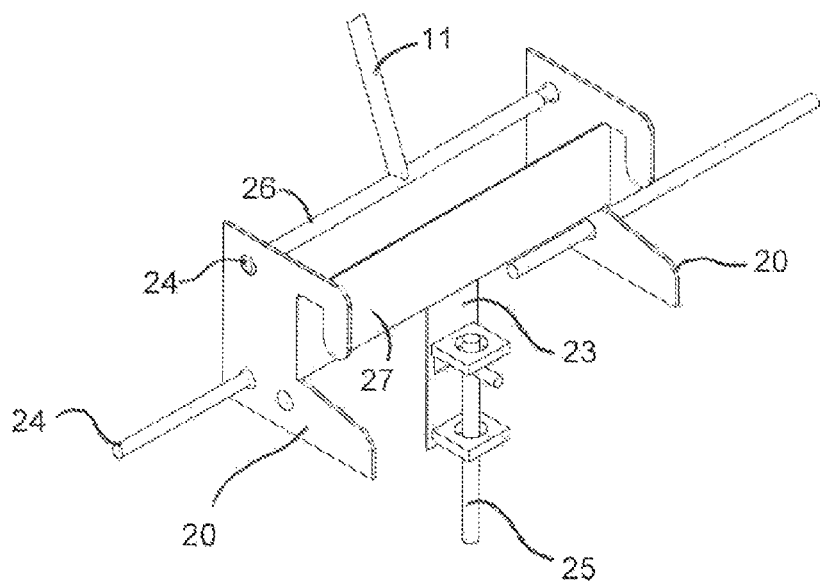
FIG. 4 is an isometric top view of the embodiment shown in FIG. 3.
Figure 5:
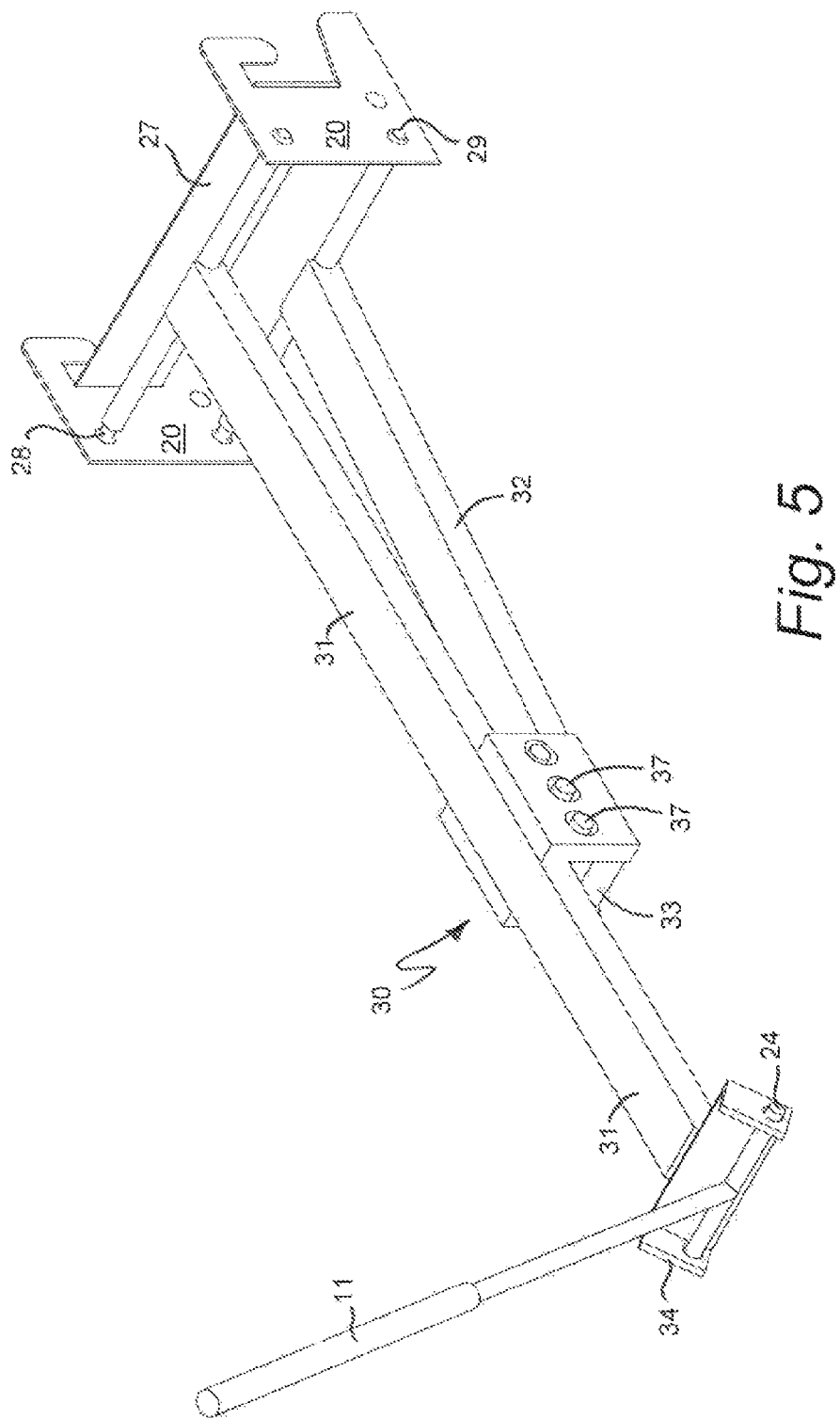
FIG. 5 is an isometric top view of a preferred embodiment of the optional I-shaped extension assembly with the diagonal knee-brace for extending the distance between the catapult base and stake bed rail.
Figure 6:
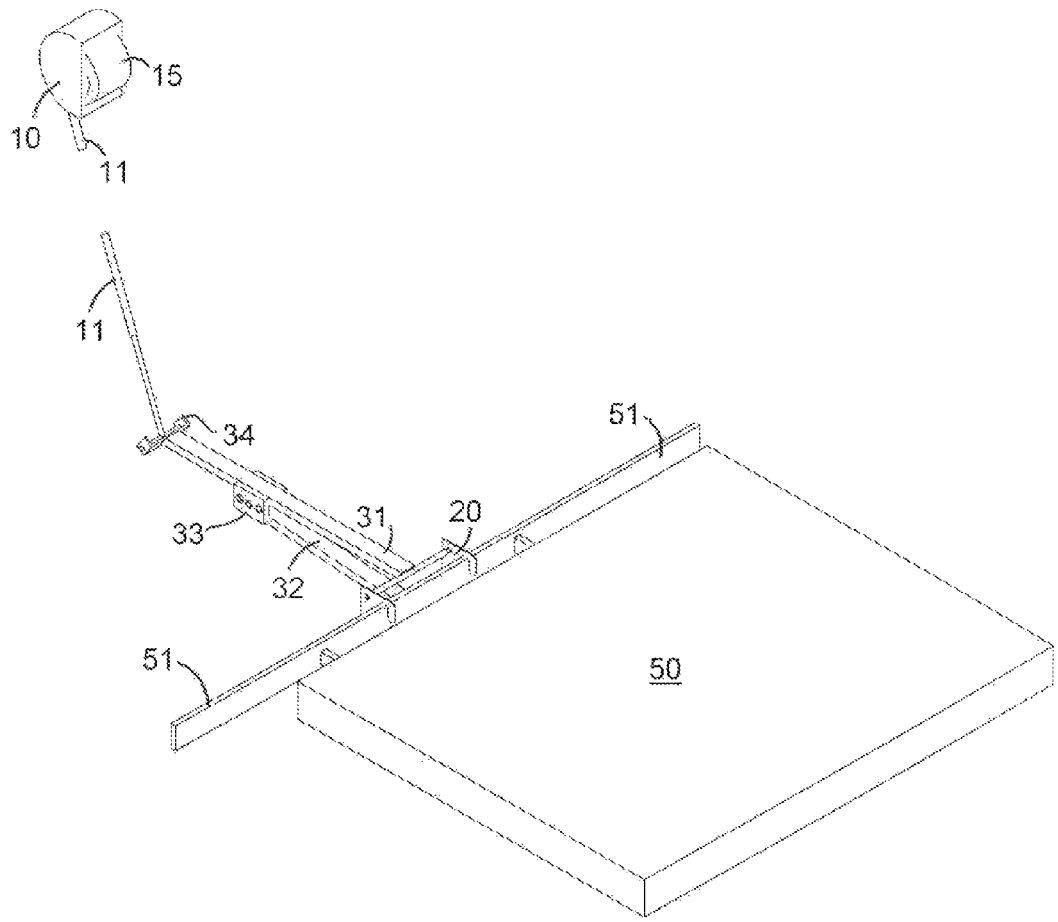
FIG. 6 is an isometric top view of the embodiment shown in FIG. 5 showing a preferred installation of the present invention.

Referring now to FIGS. 2-4, another preferred embodiment is illustrated where the catapult frame, of the cargo strap launching device, includes a pair of hook plate sidewalls 20. The hook plate sidewalls 20 are connected in a horizontal spaced relationship with a horizontal beam. The beam is preferably a steel plate 27, but maybe of any member sufficient to withstand the load. The sidewalls 20 including a first pair of oppositely and coaxially aligned clear holes, said first pair of clear holes are capable of coaxially receiving a first horizontal bar 24, and the lower end of the lever arm 11 is connected to a sleeve 26. The sleeve 26 sized so that it is capable of being rotatably engaging the first horizontal bar 24.

As above, the present invention is preferably constructed as an assembly. Here, the bucket 10 may, but need not, include a longitudinal connector 16 so that an upper end of the lever arm 11 may be connected to the longitudinal bucket connector 16, and the sleeve 26 includes a perpendicular longitudinal connector 14 so that the lower end of the lever arm 11 is capable of being connected to the sleeve 26 with the longitudinal sleeve connector 14.

The vertical plate 27, is desirably connected to a generally C-shaped internal cavity formed in each of said sidewalls 20 so that said vertical plate 27 horizontally extends with a proximal parallel face which is capable of biasing against said rail 51.

Referring now to FIGS. 3 and 4, the catapult frame desirably includes a generally U-shaped vertical bracket 23 connected to the horizontal plate 27. The U-shaped bracket 23 includes a pair of coaxially aligned clear holes being adapted to slidably receive an L-shaped lock pin 25. The lock pin 25 is operable to bias an end of the lock pin 25 against either one of an upper or a lower edge of the stake bed rail 51.

In order to secure a staked load which is wider than the overall width of the stake bed and rail assembly, the present invention includes a generally I-shaped built up lateral extension member 31 which is capable of extending the sleeve 26 in a lateral spaced relationship relative to the rail 51. The extension member 31 has at a first end thereof a first perpendicular tubular member being capable of rotatable connection about a second horizontal bar 28. The extension member 31 has at a second end thereof a generally U-shaped angle bracket 34. The U-shaped angle bracket 34 has a pair of coaxially oppositely aligned clear holes which are adapted to receive the first horizontal bar 24 so that the lower end of the lever arm 11 is capable of being connected to the sleeve 26. With this configuration, the extension member 31 is capable of providing a double pivot action for launching the cargo strap coil 15 over the load to be secured.

However, it may also be desirable to stiffen the lateral extension member 31 in a horizontal position. In yet another presently preferred embodiment, the side walls further include a second pair of oppositely and coaxially aligned clear holes, and the lateral extension member 31 further includes a knee-brace 32 adapted to horizontally stiffen the I-shaped lateral extension member 31. The knee-brace 32 has at a first end thereof a second perpendicular tubular member being capable of rotatably engaging a third horizontal bar 29. The third horizontal bar 29 is capable of being received through the second pair of clear holes. The knee-brace 32 is diagonally connected at a second end thereof to the I-shaped member to stiffen the assembly. It is also preferred, that the diagonal connection is a pinned bracket 33 disposed between the I-shaped lateral extension member 31 first and second ends, and the second end of the knee-brace being adapted to receive at least one pin 37 capably of engaging said pined bracket 33. In this manner the knee-brace 32 and I-shaped extension member 31 are operable on an angularly variable plane relative to horizontal, depending on any desired predetermined use.

While the present invention has been described in connection with the illustrated embodiments, it will be appreciated and understood that modifications may be made without departing, from the true spirit and scope of the invention.

I claim:

1. A cargo strap coil launching device, comprising:
   (a) a catapult frame being capable of being mounted on a trailer stake pocket bed rail;
   (b) a lever arm having an upper and a lower end, said lower end being connected to said catapult frame;
   (c) a bucket connected to said lever arm upper end, said bucket having a generally rectangular ejection opening so that said bucket is capable of retaining and then releasing a coiled cargo strap; and
   (d) wherein said frame is either one of a clip, hook, or fork being pivotally connected to said bed rail.

2. A cargo strap launching device, comprising:
   (a) a catapult frame being capable of being mounted on a trailer stake rocket bed rail;
   (b) a lever arm having an upper and a lower end, said lower end being connected to said catapult frame;
   (c) a bucket connected to said lever arm upper end, said bucket having a generally rectangular ejection opening so that said bucket is capable of retaining and then releasing a coiled cargo strap, and
   (d) wherein said catapult frame includes a pair of hook plate sidewalls being connected in a horizontal spaced relationship with a horizontal beam, said sidewalls including a first pair of oppositely and coaxially aligned clear holes, said first pair of clear holes being capable of coaxially receiving a first horizontal bar, and said lower end of said lever arm is connected to a sleeve, and whereby said horizontal bar is pivotally received in said sleeve.

3. The cargo strap launching device according to claim 1, wherein said bucket includes a longitudinal connector and said upper end of said lever arm is connected to said longitudinal bucket connector.

4. The cargo strap launching device according to claim 2, wherein said sleeve includes a perpendicular longitudinal connector and said lower end of said lever arm is connected to said longitudinal sleeve connector.

5. The cargo strap launching device, according to claim 2, wherein said horizontal beam is a vertical plate, said plate connected to a generally C-shaped internal cavity formed in each of said sidewalls so that said vertical plate horizontally extends with a proximal parallel face capable of biasing against said rail.

6. The cargo strap launching device according to claim 2, wherein said catapult frame further includes a generally U-shaped vertical bracket connected to said horizontal beam, and said U-shaped bracket includes a pair of coaxially aligned clear holes being adapted to slidably receive an L-shaped lock pin, said lock pin being capable of biasing against either one of an upper or a lower edge of said rail.

7. The cargo strap launching device, according to claim 4, further comprising a generally I-shaped built up lateral extension member capable of extending said sleeve in a lateral spaced relationship relative to said rail, said extension member having at a first end thereof a first perpendicular tubular member being capable of rotatable connection about a second horizontal bar, and said extension member having at a second end thereof a generally U-shaped angle bracket, said U-shaped angle bracket having a pair of coaxially oppositely aligned clear holes being capable of receiving said first horizontal bar so that said lower end of said lever arm is capable of being connected to said sleeve when said sleeve is rotatably engaging said first horizontal bar.

8. The cargo strap launching device, according to claim 7, wherein said side walls further include a second pair of oppositely and coaxially aligned clear holes, and said lateral extension member further includes a knee-brace adapted to horizontally stiffen said I-shaped lateral extension member, said knee-brace having at a first end thereof a second perpendicular tubular member being capable of rotatable connection engaging a third horizontal bar, said third horizontal bar capable of being received through said second pair of clear holes, and said knee-brace being diagonally connected at a second end thereof to said I-shaped member.

9. The cargo strap launching device, according to claim 8, further comprising a pinned bracket disposed between said I-shaped lateral extension member first and second ends and said second end of said knee-brace being adapted to receive at least one pin pinned engaging said pinned bracket.

10. The cargo strap launching device according to claim 2, wherein said bucket includes a longitudinal connector and said upper end of said lever arm is connected to said longitudinal bucket connector.

11. A cargo strap coil launching device, comprising:
 (a) a trailer stake pocket bed rail;
 (b) a catapult frame being capable of being mounted on said bed rail;
 (c) a lever arm having an upper and a lower end, said lower end being connected to said catapult frame; and
 (d) a bucket connected to said lever arm upper end, said bucket having a generally rectangular ejection opening so that said bucket is capable of retaining and then releasing a coiled cargo strap.

12. The cargo strap coil launching device according to claim 11, wherein said frame is either one of a clip, hook, or fork being pivotally connected to said bed rail.

13. The cargo strap coil launching device according to claim 12, wherein said bucket includes a longitudinal connector and said upper end of said lever arm is connected to said longitudinal bucket connector.

* * * * *